(12) United States Patent
Berger

(10) Patent No.: US 6,504,821 B2
(45) Date of Patent: *Jan. 7, 2003

(54) FLEXIBLE BANDWIDTH NEGOTIATION FOR THE BLOCK TRANSFER OF DATA

(75) Inventor: Arthur W. Berger, Fair Haven, NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/868,857

(22) Filed: Jun. 4, 1997

(65) Prior Publication Data

US 2002/0146036 A1 Oct. 10, 2002

Related U.S. Application Data

(60) Provisional application No. 60/109,620, filed on Jun. 12, 1996.

(51) Int. Cl.[7] .............................. H04L 1/00; H04L 12/28
(52) U.S. Cl. ................................. 370/236.1; 370/395.41
(58) Field of Search ................................ 370/229, 230, 370/231, 232, 235, 236, 237, 395, 396, 400, 465, 468, 274, 410; 455/452; 395/200.62, 200.63

(56) References Cited

U.S. PATENT DOCUMENTS

| | | | | |
|---|---|---|---|---|
| 5,365,524 A | * | 11/1994 | Hiller et al. | 370/376 |
| 5,432,824 A | * | 7/1995 | Zheng et al. | 370/235 |
| 5,515,359 A | * | 5/1996 | Zheng | 370/230 |
| 5,633,867 A | * | 5/1997 | Ben-Num et al. | 370/399 |
| 5,754,530 A | * | 5/1998 | Awdeh et al. | 370/23 |
| 5,777,984 A | * | 7/1998 | Gun et al. | 370/230 |
| 5,784,358 A | * | 7/1998 | Smith et al. | 370/230 |
| 5,812,527 A | * | 9/1998 | Kline et al. | 370/232 |
| 5,862,136 A | * | 1/1999 | Irwin | 370/395 |
| 6,094,431 A | * | 7/2000 | Yamato et al. | 370/395 |

OTHER PUBLICATIONS

Patent No. EP 0693841A1, published on Jan. 24, 1996, inventor: P. Boyer et al. Translation: U.S. equivalent (5,600, 645) included.

F. Guillemin, "ATM Block Transfer Capability vs. Available Bit Rate Service," *European Transactions on Telecommunications*, vol. 8, No. 1, Jan.–Feb. 1997, pp. 21–32.

N. Wakamiya et al., "Fair Bandwidth Allocation in FRP–Based ATM Local Area Networks," *IEICE Trans. Comm.*, vol. E79–B, No. 5, May 1996, pp. 627–638.

* cited by examiner

*Primary Examiner*—Melvin Marcelo
*Assistant Examiner*—Andy Lee
(74) *Attorney, Agent, or Firm*—Ahsan & Associates; Aziz M. Ahsan; Benjamin S. Lee

(57) ABSTRACT

When a network element receives a request for an increase in bandwidth via a resource management (RM) cell, the network element determines the rate that it can support. If the rate that the network element can support is less than the requested rate, rather than simply rejecting the requested rate, the network element overwrites the rate encoded in the appropriate field in the arriving RM cell with a lower rate than requested. If the network element can support the requested rate, the rate encoded in the RM cell is left unchanged and the RM cell is transmitted to the network along the connection.

24 Claims, 6 Drawing Sheets

FLEXIBLE BANDWIDTH NEGOTIATION FOR THE BLOCK TRANSFER OF DATA

CROSS REFERENCE TO RELATED APPLICATION

This application claims the benefit of U.S. Provisional Application Ser. No. 60/109,620 filed Jun. 12, 1996.

FIELD OF THE INVENTION

The present invention relates to a system and method for transmitting blocks of data between network nodes and end systems coupled to a network. Specifically, the system and method provide capability for a network node, source system or destination system on the network to selectively reduce or increase bandwidth allotted to a given connection.

BACKGROUND OF THE INVENTION

Asynchronous transfer mode (ATM) involves the transfer of data in discrete digital packets between two end systems coupled to a network. The discrete packets of data are known as cells. ATM block transfer (ABT) is an ATM transfer capability in which data is partitioned into blocks of data cells that are delineated by resource management (RM) cells, which contain stored information to describe the characteristics desired for transfer of the ensuing blocks of data cells. For example, an ABT RM cell contains a value stored in a block cell rate (BCR) field, which represents the maximum rate at which the subsequent block of data cells may be transmitted.

In existing block transfer capabilities, a network element makes a binary decision to accept or reject a request from an end-system for a new, or higher block cell rate. The following scenario illustrates the implications of this binary decision with reference to FIG. 1. A source end system is coupled to a destination end system through a plurality of network nodes, via an ATM connection. However, no bandwidth is initially allocated to this connection. When a source end system needs to send a block of data, it initiates a request, for a specific block cell rate (BCR), to a given destination end system. The request is made by the source issuing an ABT RM cell on the previously established connection requesting the network to allocate bandwidth to the connection at the desired block cell rate.

If a network node cannot grant the requested rate, the network node rejects the request, even though it might be able to support a lower rate. This is inefficient because in almost all cases, the source does not have a minimum speed requirement, and simply needs to transmit data at the highest rate supported by the network. However, neither during nor after the rejection does the network node communicate what rate it could have accepted back to the source. Thus, the source system has to blindly issue a new ABT RM cell requesting a lower rate. This request might in turn be rejected, requiring one or more further requests before a request is granted. A binary decision by a network node to accept or reject a requested BCR based on available bandwidth, therefore, leads to inefficiency through a needless proliferation of RM cell requests for bandwidth.

SUMMARY OF THE INVENTION

The deficiencies of a binary decision to accept or reject a request for bandwidth described above are remedied with a flexible bandwidth negotiation. Each network element along a connection between a source and destination system can reduce the requested bandwidth to a level that the network element can grant. When a network element receives a request for an increase in bandwidth, the network element determines the rate that it can support. If the rate that the network element can support is less than the requested rate, rather than simply rejecting the requested rate, the network element overwrites the rate encoded in the appropriate field in the arriving RM cell with a lower rate than requested, based on the rate that the network element determined that it could support. If the network element can support the requested rate, the rate encoded in the RM cell is left unchanged.

A network element that selectively modifies a rate of a block transfer connection includes ingress and egress links that are coupled to a network. A control unit is coupled to the ingress and egress links and receives a cell having a block cell rate encoded therein for a connection. The control unit modifies the encoded block cell rate and transmits the cell along the connection to establish the modified rate.

A method for selectively modifying a rate of a block transfer connection includes receiving a cell from a network having an encoded requested rate for requesting additional bandwidth. An available rate that can be granted to the request is determined, either upon or prior to the arrival of the cell, which may be less than the requested rate. The received cell is then modified by writing the available rate into the cell over the requested rate and is then transmitted back into the network on the given connection. Subsequently, the source end-system learns of the rate granted to the connection.

BRIEF DESCRIPTION OF THE FIGURES

The invention is more fully described with reference to the accompanying figures and detailed description.

DETAILED DESCRIPTION OF INVENTION

Figure 1:
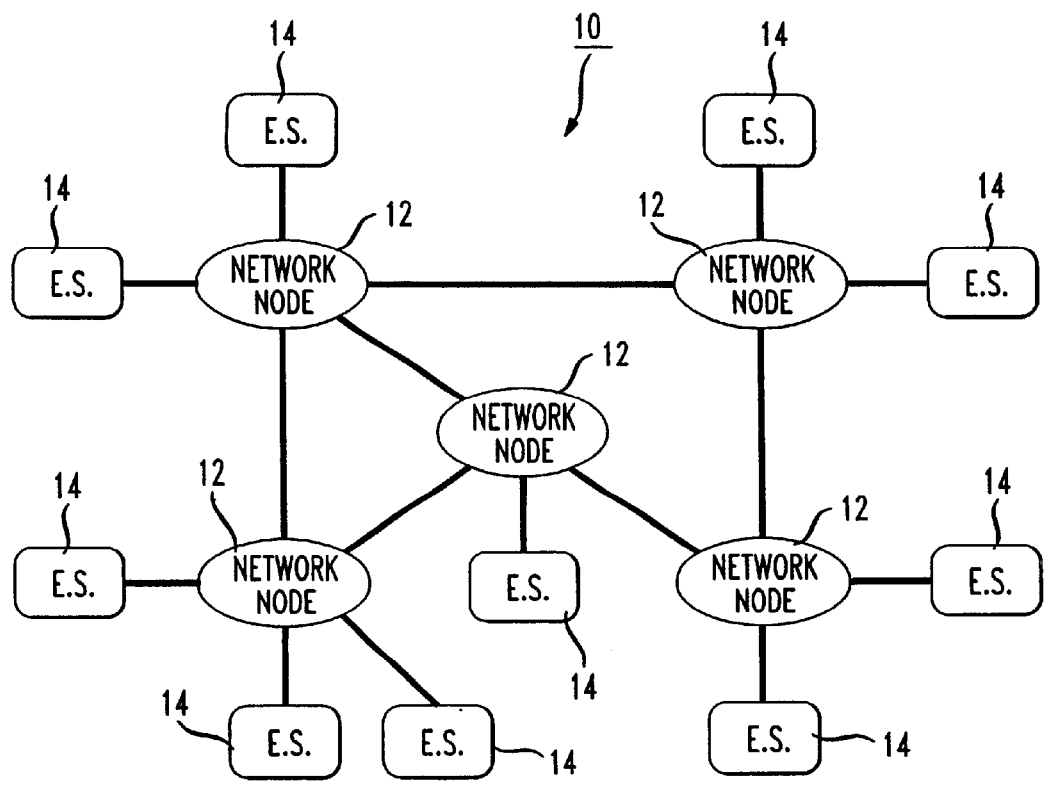
FIG. 1 depicts a network, public or private, including a plurality of end systems and network nodes coupled together.

FIG. 1 depicts a network 10 in which the invention finds application. The network 10 may be a public network, such as the public telephone network. Conversely, the network 10 may be a private network such as a local area network interconnecting offices within a company. Referring to FIG. 1, the network 10 includes network nodes 12 and end systems 14 collectively referred to as network elements. The network nodes 12 and end systems 14 are coupled together, for example electrically, optically, or wirelessly, thus enabling the exchange of information between end systems 14 and network nodes 12 and any combination thereof on the network 10. The network nodes 12 may represent telephone switching equipment, cross connects, or customer premises equipment, that is geographically dispersed over a large region. Conversely, each network node 12 may represent a server or router, and may be a single machine or may be distributed across a plurality of machines.

The end systems 14 that are coupled to the network nodes 12 may be a single computer or a gateway to a local area network that includes a plurality of computers coupled to the network 10. The end systems 14 of FIG. 1 may also be end offices or private branch exchange (PBX) systems of a telephone network that are capable of transmitting and receiving digital packets of information such as in a broadband integrated services digital network (B-ISDN). The end systems 14 of FIG. 1 define the extremities of a network 10 in which a digital block transfer protocol such as the asynchronous block transfer protocol is capable of implementation.

Two end systems 14 may transmit data to each other in digital packets called cells, for example, using an asynchronous transfer mode (ATM). When such transmission of data takes place over the network 10, there are two ATM connections. One transporting ATM cells in one direction and the other transporting ATM cells in the opposite direction. Consider one of these connections; the end system 14 that is emitting cells onto this connection is the "source", and the end-system 14 receiving these cells is the "destination". The direction from the source to the destination is the "forward" direction. The companion ATM connection transmits cells in the "backward" or "reverse" direction. The term connection, as used herein, includes a virtual connection, virtual channel connection, and virtual path connection within the context of asynchronous transfer mode, and the flow of packets in the context of an internet protocol.

Figure 2:
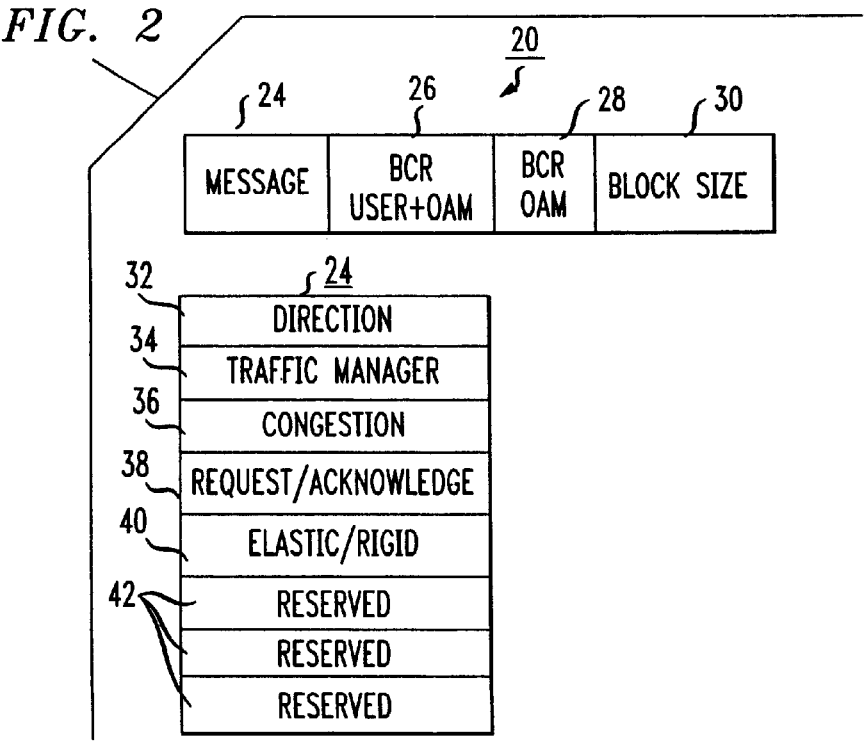
FIG. 2 depicts a table of stored information fields contained within a resource management cell.

The cells include at least two types: resource management (RM) cells 20, illustrated in FIG. 2, and data cells. Data cells are generally fixed in size, although they may be variable, and contain digital information that represents a packet of information taken from a larger whole. For example, several data cells may contain the contents of a word processor file transmitted from one user at a computer coupled to a network 10 to another user on the network 10.

RM cells 20 describe characteristics desired for a given connection. They are initiated by a source system 14, a destination system 14, or a network node 12 to alter a given connection. Upon issuance, a RM cell 20 may propagate through each network node 12 in the forward and backward direction along the connection giving each node 12 and the source and destination systems 14 a chance to accept, reject, or alter the characteristics of the connection defined in the RM cell 20. When particular RM cells 20 delineate blocks of data cells for transmission, the connection is a block transfer. Block transfer may be implemented in a variety of ways including ATM block transfer (ABT) as described in International Telecommunications Union (ITU) Recommendation I.371, "Traffic Control and Congestion Control in B-ISDN," Geneva, May, 1996. The connection characteristics are stored as bits within the RM cell 20, and the bits are stored in standardized fields within the RM cell 20 in such a manner that the bits are recognized by the end systems 14 and network nodes 12 coupled to the network 10. FIG. 2 depicts an example of fields within an RM cell. In one embodiment of the invention, each field includes one or more groups of eight bits known as octets, each bit or group of bits of which is available to describe an aspect of the connection characteristics.

According to FIG. 2, a rate of transmission of user-data plus user Operations-Administration-and-Maintenance (OAM) cells is specified by a block cell rate (BCR) field of bits 26 which occupies two octets. Similarly, a second rate of transmission for user OAM cells is specified in a second BCR field 28 which also occupies two octets. The values stored in the BCR fields 26 and 28 may be altered independently or together according to the present invention. Furthermore, a RM cell 20 may be configured to have a plurality of BCR fields corresponding to different types of data, affording the opportunity to negotiate for bandwidth with respect to each type. A block size field 30 indicates the size of a block of data to be transmitted.

A message field 24 includes an octet, each bit of which specifies the type of RM cell 20 that is being transferred. A direction bit 32 specifies the direction for which the ABT RM cell 20 applies. A traffic management bit 34 specifies whether the RM cell 20 was issued by a network node 12 or an end system 14. A congestion indication bit 36 indicates whether a request for a desired BCR succeeded or failed. A request/acknowledgment bit 38 is used to distinguish request RM cells 20 that are sent to request or modify a connection from acknowledgment RM cells 20 that are sent by a network node 12 or end system 14 to respond to a request RM cell 20. An elastic/rigid bit 40 indicates whether the rate stored in the BCR field 26 or 28 of a request RM cell 20 may be changed by a network node 12 or end system 14 receiving the request RM cell 20, thus providing a toggle to enable or disable the flexible bandwidth negotiation capability. Three bits 42 of an octet within the message field 24 are reserved. These bits may be used to further distinguish message types or for other convenient purposes. In the following discussion and examples, BCR field 26 is utilized to illustrate the operation of the present invention. However, it will be understood that BCR field 28 and any number of additional BCR fields present in a RM cell operate under the same principles as are hereinafter described.

Figure 3:
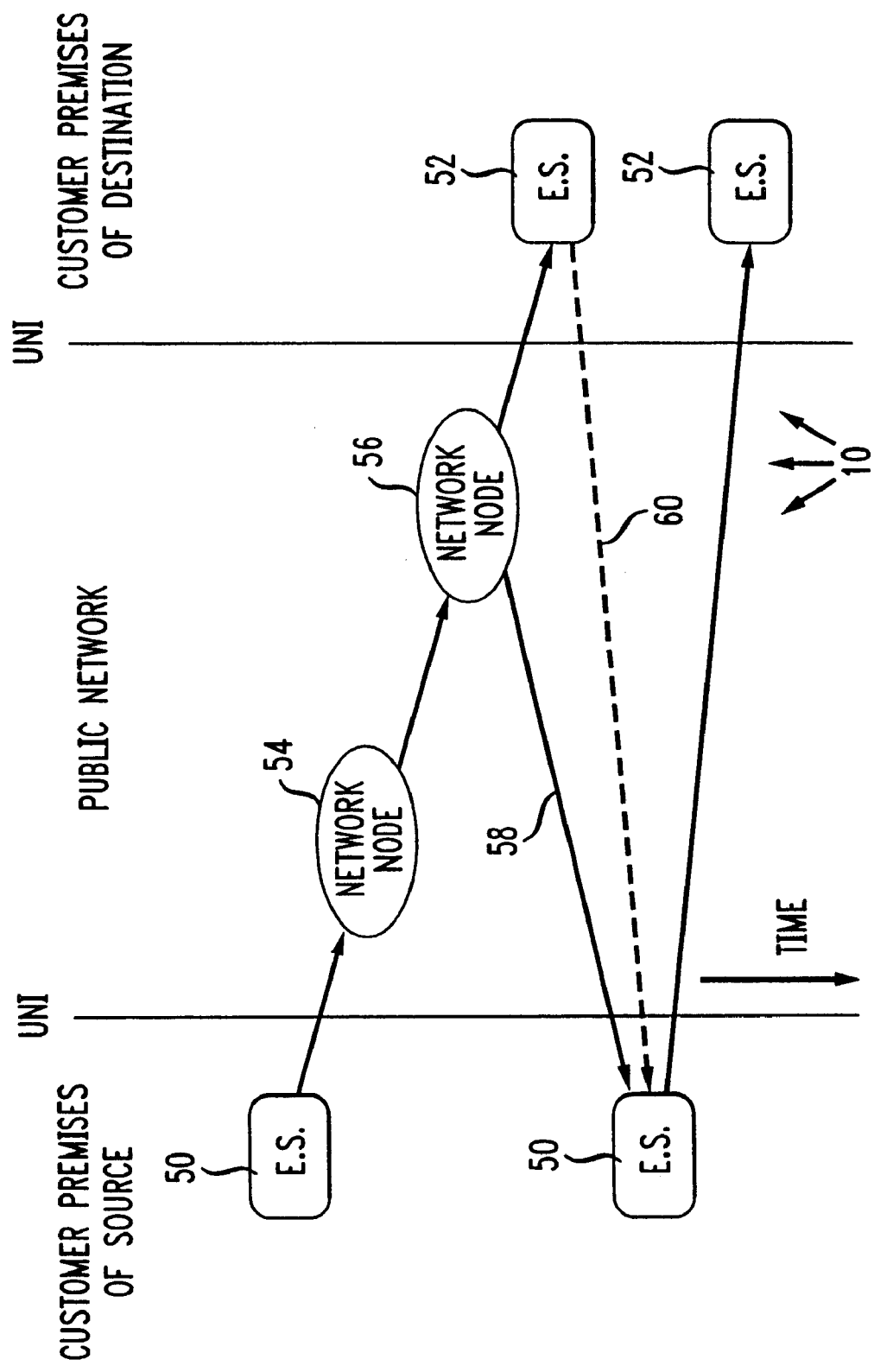
FIG. 3 depicts an interaction between a source system and a destination system over a network during a request from the source to increase bandwidth for the block transfer of data.

FIG. 3 illustrates an interaction between a source 50, a destination 52, and two network nodes designated 54 and 56 when the source 50 requests a bandwidth increase (the terms bandwidth, BCR, and rate are used interchangeably herein with respect to requesting a rate of transmission for a block of cells) for a forward connection. The source 50 emits a RM cell 20 requesting a rate corresponding to the value in the BCR field 26, which represents an increase over the rate presently allotted to the connection. Each network element including network nodes 54 and 56 and the destination system 52 along the connection receives the RM cell 20 and makes a determination of whether to accept, reject, or alter the request before retransmitting the RM cell 20 to the next node or end system. One of the network elements may not be able to grant the bandwidth requested, for example because the bandwidth is not available due to a large volume of connections currently being handled. Under the prior art, the rejecting network element would have set a bit, for example the congestion indication bit 30, indicating that the request for bandwidth is denied. According to the present invention, however, each network element determines the bandwidth that it has available to grant. If the available bandwidth to grant to the connection is greater than the bandwidth currently allotted to the connection, but less than the requested rate, the network node rewrites the BCR field 26 of the RM cell with the value the network node has determined to grant and forwards the RM cell 20 toward the destination 52. A variation of the last step is to include the case where the determined available bandwidth can be below the currently allotted bandwidth. If the elastic/rigid bit 40 in the RM cell request is set with a value corresponding to rigid, however, the network node 54 or 56 without available bandwidth to satisfy the request will simply reject the request in binary fashion.

Once the RM cell reaches an extremity of the destination side of the network 10, an acknowledgment bit 38 within the RM cell 20 is set, a direction bit 32 is set to backward, and the acknowledgment RM cell 20 is sent back to the source 50 containing the updated value in the BCR field 26 of the RM cell 20. Referring to FIG. 3, the extremity of the network 10 may be defined as either the public network side of the user network interface (UNI). In this event, the acknowledgment RM cell 20 is sent along the path 58. Conversely, the extremity of the network 10 may be defined as any point within the destination system 52, which may be a complex network having many geographically dispersed nodes. In this event, the acknowledgment RM cell 20 is sent from a point within the destination system on the connection in the backward direction, which traverses the same set of nodes as the forward connection. This is indicated by the path 60. Upon receipt of the acknowledgment RM cell, each network node may determine that it lacks additional bandwidth to allocate for the requested increase in rate. In this event, the node may rewrite the value in the BCR field 26 of the RM cell 20 to a lower rate, which may be more or less than the original rate of the forward connection. Subsequently, the acknowledgment RM cell 20 reaches the source system 50 as shown in FIG. 3.

In response to receiving the acknowledgment RM cell 20, updated as described by the network 10, the source 50 transmits a new forward RM cell 20 to the network 10 with a value in the BCR field 26 set to the rate contained within the acknowledgment RM cell 20 and subsequently transmits a block of data cells at up to the rate specified by the forward RM cell 20.

Figure 4:
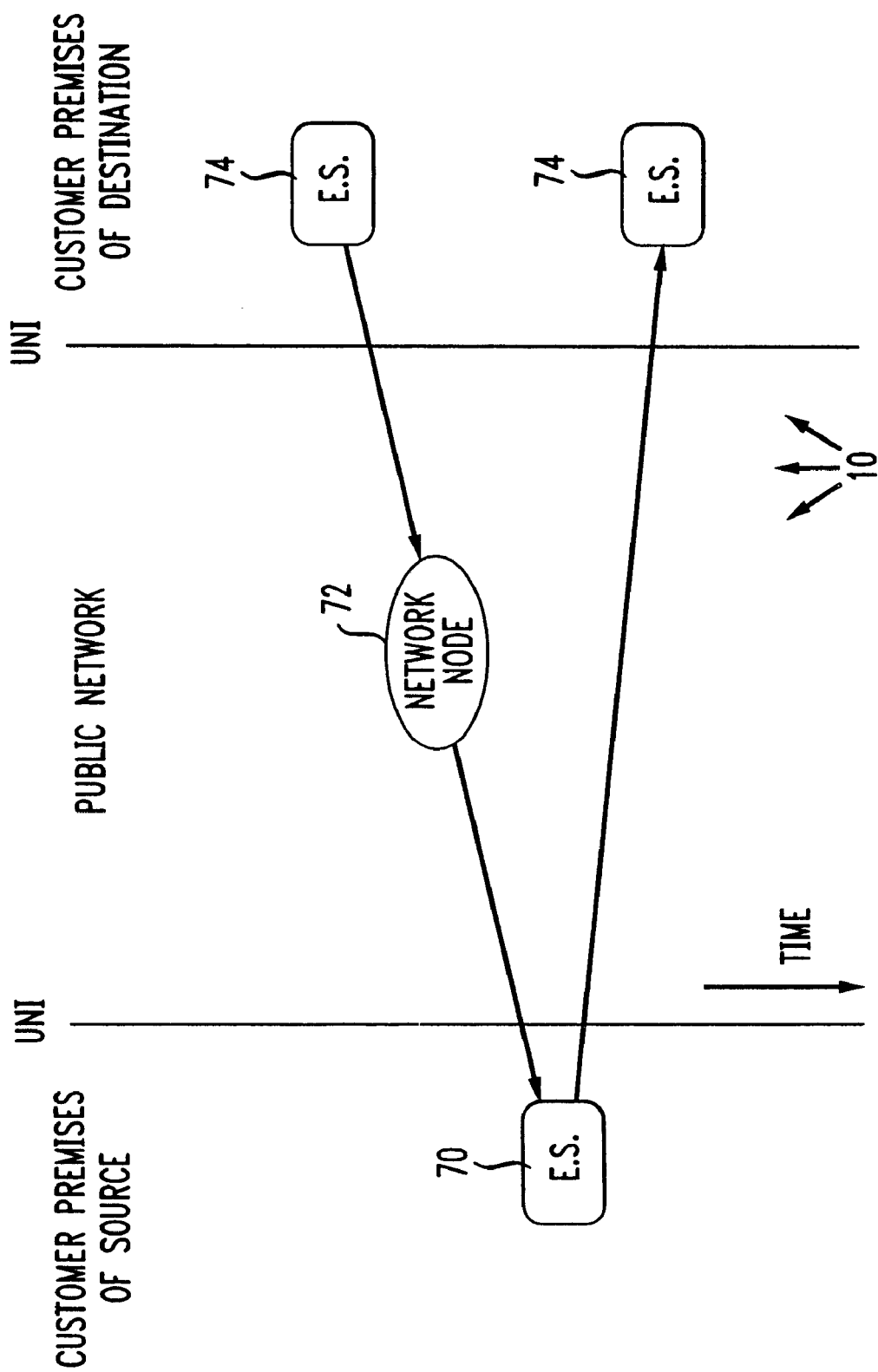
FIG. 4 depicts an interaction between a source system and a destination system over a network during a request from the destination to increase bandwidth for the block transfer of data.

FIG. 4 represents a bandwidth increase requested by a destination end system 74. This case is analogous to a bandwidth increase request by a source end system described above with reference to FIG. 3. First, the destination 74 emits (on the backward connection) an ABT RM cell 20 having a value in the BCR field 26 in excess of that which is presently allotted to the forward connection. The RM cell 20 has a direction bit 32 equal to the opposite of the value for the forward direction, for example "1". The backward direction is indicated because the destination is requesting a bandwidth increase for the forward connection.

The backward-direction request RM cell 20 is then received by one or more network nodes 72 in the reverse direction en route to the source 70. Each network element in the path may grant the BCR rate in the RM cell request by not altering the value in the BCR field 26. Conversely, each network node 72 may reduce the value to a rate which the network node 72 chooses to provide by rewriting the value in the BCR field 26. In each case, a network node receives the RM cell 20, takes some action on the BCR field 26 if required, and forwards the RM cell 20 toward the source 70. The source end system 70 then decides whether it can support the rate contained in the BCR field 26 of the RM cell 20 and if so, sets the request/acknowledgment bit to "acknowledgment" and the direction bit to "forward", and transmits the RM cell 20 back toward the destination 74 with the supported rate in the BCR field 26. Subsequently, the source 70 may emit a block of data cells transmitted at the supported BCR.

FIGS. 3 and 4 illustrate bandwidth negotiation under a delayed transmission block transfer protocol (or scheme) where the source waits to receive an acknowledgment RM cell before increasing, possibly from zero the block cell rate. An example of such a block transfer protocol is provided by the ABT-delayed transmission (DT) transfer capability specified by the ITU. An alternative to delayed transmission is an immediate transmission protocol, for example the ABT-immediate transmission (IT) transfer capability specified by the ITU. Under an immediate block transfer protocol, a request RM cell 20 is emitted from either a source or a network node requesting an increase in bandwidth. Immediately following issuance of the request RM cell 20 by a source to the network 10, a block of data cells is transmitted at the requested rate. A network node receives the RM cell 20 and the data cells, but if the network node cannot grant the rate in the BCR field 26 of the RM cell 20, the network node rewrites the BCR field 26 of the RM cell 20 with the rate that the network node chooses to grant and emits the subsequent data cells at the lower, granted rate. While this rate is being returned to the source via the acknowledgment RM cell 20 described above, to prevent the loss of data the receiving network element must receive and temporarily store the backlog that occurs as the cells arrive at a higher rate than the node is currently emitting them. Subsequently, the transmission rate of the source is reduced by a new RM cell issued by the source. A network node might request an increase in bandwidth for an immediate transmission, for example, if it had previously lowered the requested rate, accumulated a backlog of cells, and needs to emit cells at a higher rate to reduce or eliminate the accumulation.

Figure 5:
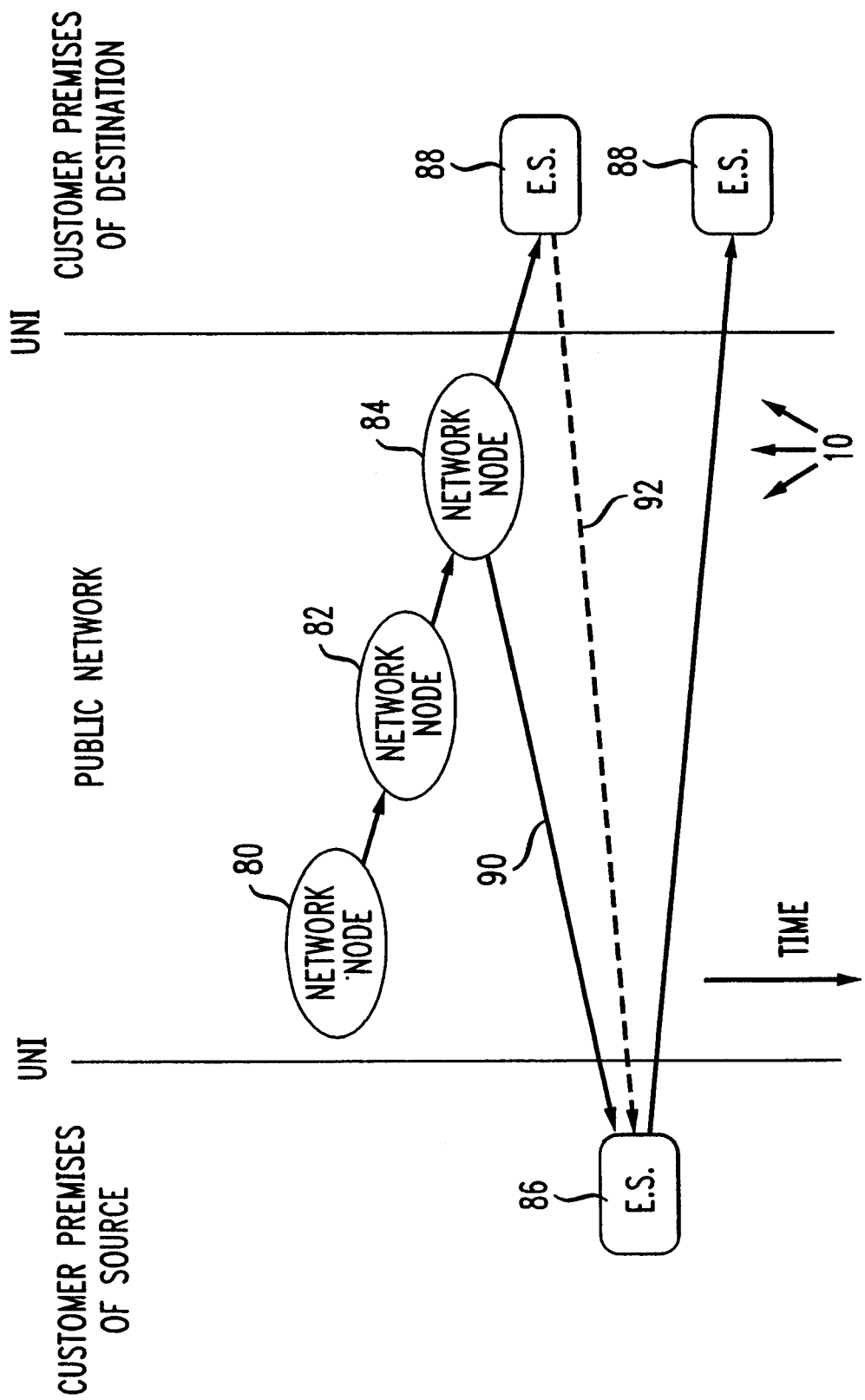
FIG. 5 depicts an interaction between a network node and a source and destination system over a network during a request from the network to change the bandwidth allocated to a connection.

A bandwidth reduction may also be initiated by a network element as shown in FIG. 5. The network node 80 emits a traffic management (TM) RM cell 20 having a traffic management bit 34 appropriately set, and value in the BCR field 26 that is lower than the current rate of the connection, representing a reduction of the rate allocated to the connection. Upon receipt of RM cell 20, network node 82 can use the flexible-bandwidth-negotiation capability and reduce the value in the BCR field 26 and forward the RM cell 20 to the next node. Network node 82 sends a notification to the destination 88 through node 84. A RM cell 20 is sent to the source 86 either by the network node on the network side of the egress UNI (network node 84 in FIG. 5) or a point in the end system 88. A network node receiving the acknowledgment RM cell 20 along the reverse connection may further reduce the BCR field in the acknowledgment RM cell based on its available bandwidth. When the source end system 86 receives the acknowledgment RM cell 20, it initiates a forward acknowledgment RM cell 20 with the BCR value set to the BCR value in the received backward acknowledgment RM cell 20. Subsequently, the source 86 sends user data cells emitted at a rate no greater than the value specified in the BCR field 26. Network nodes can allocate resources according to the BCR value in the forward acknowledgment RM cell 20. Thus, if due to the prior network generated RM cell 20 or the prior backward acknowledgment RM cell 20, a network element has been tentatively reserving resources for a BCR whose value is greater than the resulting BCR value in the forward acknowledgment RM cell 20, then the network element can make the appropriate reduction in resources reserved.

Flexible bandwidth negotiation for network generated TM RM cells is beneficial in circumstances where multiple network elements might be initiating bandwidth renegotiation for a given connection within the time it takes for a round-trip between the source and destination systems over the network 10. This could occur, for example, when the block is about to become non-conforming to the "sustainable cell rate" traffic descriptor or when a region of a network is receiving a high load of bandwidth requests, and per-connection allocation schemes cause the reduction of BCRs previously granted to current ATM blocks.

Figure 6:
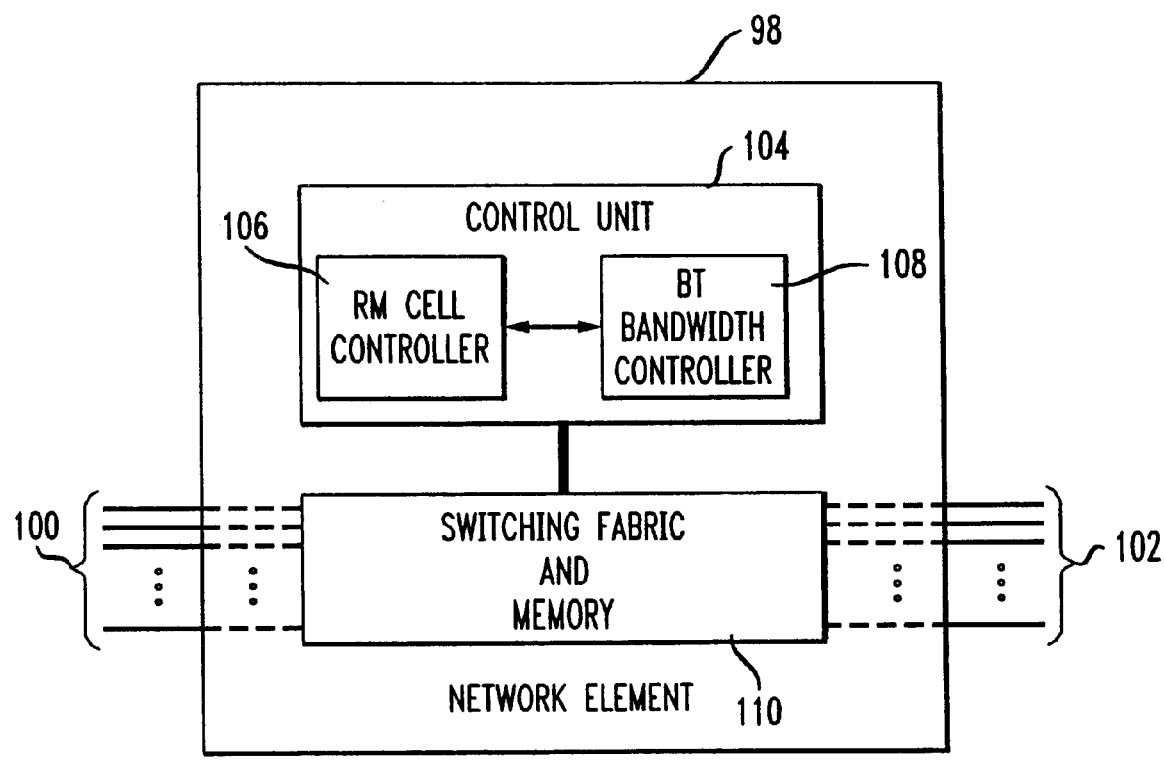
FIG. 6 depicts an exploded view of a network node that illustrates the component parts of the network node.

FIG. 6 illustrates an expanded view of a network element 98. The network element 98 includes ingress links 100 and egress links 102 across which connections are established. Coupled to the ingress links 100 is switching fabric and memory 110 which is in turn coupled to a control unit 104. The switching fabric and memory 110 receives cells from the ingress links 100, exchanges control data with the control unit, and routes the cells from the ingress links 100 to the appropriate egress links 102 based on data received from the control unit. The control unit 104 receives RM cells 20 from the switching fabric and memory 110 that pertain to a plurality of connections between various source and destination systems that pass through the switching fabric and memory 110. The control unit 104 includes a RM cell controller 106 coupled to a block transfer (BT) bandwidth controller 108. The BT bandwidth controller 108 of the control unit 104 monitors the connections on the ingress links 100 and egress links 102 and determines the amount of bandwidth at the network element 98 to allocate to each connection.

When a RM cell 20 is received by a network element 98 over the ingress links 100, the RM cell controller 106 receives the RM cell 20 and transmits certain connection characteristics including the BCR to the BT bandwidth controller 108. The BT bandwidth controller 108 determines whether the requested BCR can be furnished. If not, but a lower rate is possible, the lower rate is transmitted back to the RM cell controller 106, which writes the possible rate into the BCR field 26 of the received RM cells 20. The RM cell 20 is then transmitted to the network 10 by the network element 98 through the switching fabric and memory 110 and egress links 102 for further progress along the network 10.

Figure 7:
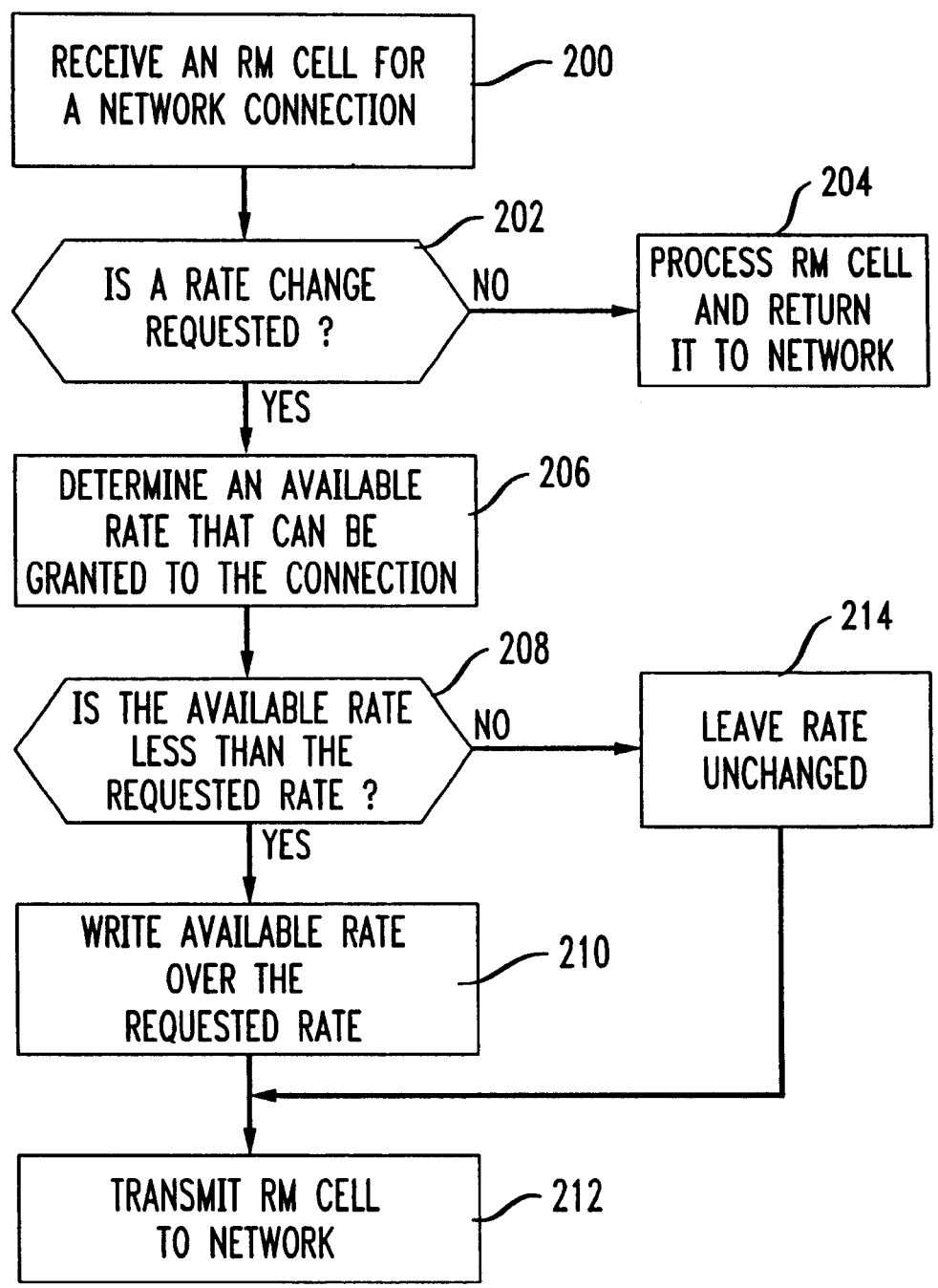
FIG. 7 depicts a method for selectively modifying a requested rate.

FIG. 7 illustrates a method according to the present invention. In step 200 a network element 98 receives a RM cell 20 requesting a higher connection rate for an established network connection. In step 202, a control unit 104 within the network element 98 determines whether the value stored in the BCR field 26 of the RM cell 20 represents a change in the rate presently allotted to the connection. If a rate change is not requested, then in step 204 the control unit 104 processes the RM cell 20 and returns it to the network 10. If a rate change is requested, then in step 206 the control unit 104 determines a rate that the network element 98 has available to grant to the connection. This determination may be based on a variety of considerations including the present and anticipated network traffic and a priority assigned to the particular connection. Also, the determination can be made prior to the arrival of the RM cell 20 and stored in the control unit 104 (or elsewhere in the network node where the control unit 104 can access it).

In step 208, the network element 98 determines whether the available rate is less than the requested rate. If not, then the rate encoded in the BCR field 26 of the RM cell 20 is left unchanged in step 214, and the RM cell is transmitted back to the network along the connection in step 212. If the granted rate is less than the requested rate or the presently established rate, then in step 210 the available rate is written over the requested rate in the BCR field 26. Subsequently in step 212, the RM cell 20 having a new BCR field 26 is transmitted back to the network for propagation along the connection.

The method steps 200–214 are applicable to requests for bandwidth initiated by a source, destination, or network node. Furthermore, overwriting the block cell rate as described may be done in either the forward or reverse directions and similarly the new block cell rate may affect the transmission rate on either the forward or reverse channel.

Although specific embodiments have been described, it will be understood by those having ordinary skill in the art that changes may be made to the embodiments without departing from the spirit and scope of the invention.

What is claimed is:

1. A network element that selectively modifies a rate of a block transfer connection, comprising:

ingress and egress links coupled to a network; and a control unit, coupled to the ingress and egress links, receiving from the ingress links a cell associated with a block containing a plurality of data cells, wherein the cell contains a block cell rate encoded therein for a connection, modifying the encoded block cell rate, and returning the cell to the network for transmission along the connection to establish the modified rate for the entire block, wherein resources are reserved in the network to provide the modified rate for the transmission of the entire block after the block cell rate is established.

2. The network element according to claim 1, wherein the network element initiates and transmits the cell to a source on the network requesting a lower block cell rate for the connection.

3. The network element according to claim 1, wherein a network node on the network initiates and transmits the cell to the network element requesting a lower block cell rate for the connection.

4. The network element according to claim 1, wherein a source initiates and transmits the cell to the network requesting a different block cell rate for the connection.

5. The network element according to claim 1, wherein a destination initiates and transmits the cell to the network requesting a different block cell rate.

6. The network element according to claim 1, wherein the cell includes a bit for selectively enabling the capability of a network node to alter an encoded block cell rate.

7. The network element according to claim 1, wherein the cell further includes a bit indicating whether the cell requests bandwidth or acknowledges acceptance of a bandwidth request at the block cell rate.

8. The network element according to claim 1, wherein the cell further includes a direction bit indicating a forward or a backward direction of connection across the network node.

9. The network element according to claim 8, wherein the direction bit is set to indicate a backward connection and the modified block cell rate affects a corresponding forward connection.

10. The network element according to claim 8, wherein the direction bit is set to indicate a forward connection and the modified block cell rate affects the forward connection.

11. The network element according to claim 1, wherein the element implements asynchronous transfer mode block transfer protocols.

12. The network element according to claim 1, wherein:

the cell includes a plurality of requested rates encoded therein; and the network element modifies at least one of the plurality of requested rates encoded in the cell.

13. The network element according to claim 12, wherein the protocols include asynchronous transfer mode block transfer with immediate transmission.

14. A network element that selectively modifies a rate of a block transfer connection, comprising:

ingress and egress links coupled to a network;

a control unit, coupled to the ingress and egress links, receiving from the ingress link a cell associated with a block containing a plurality of data cells, wherein the cell contains a block cell rate encoded therein for a connection, modifying the encoded block cell rate, and returning the cell to the network for transmission along the connection to establish the modified rate, wherein the element implements delayed asynchronous transfer mode block transfer protocols to reserve network resources to transfer the block at a constant block cell rate during the duration of the transmission.

15. A method for selectively modifying a rate of a block transfer connection, comprising the steps of:

receiving from a network a cell having a requested block cell rate encoded therein for requesting additional bandwidth;

determining an available rate that can be granted to the request that can be less than the requested block cell rate;

modifying the received cell by writing the available rate into the cell over the requested rate; and transmitting the cell to the network.

16. The method according to claim 15, wherein the cell includes a bit for selectively enabling the capability of a network node to alter an encoded block cell rate.

17. The method according to claim 15, wherein the cell includes a bit indicating whether the cell requests bandwidth or acknowledges acceptance of a bandwidth request at the block cell rate.

18. The method according to claim 15, wherein the cell includes a direction bit indicating a forward or a backward direction of connection across the network node.

19. The network element according to claim 18, wherein the direction bit is set to indicate a backward connection and the modified rate affects a corresponding forward connection.

20. The network element according to claim 18, wherein the direction bit is set to indicate a forward connection and the modified rate affects the forward connection.

21. The method according to claim 15, wherein the block transfer connection utilizes asynchronous transfer mode block transfer protocols.

22. The method according to claim 15, wherein:

the cell includes a plurality of requested rates encoded therein;

the network element determines an available rate for each encoded rate; and the network element overwrites each requested rate with the corresponding available rate when the available rate is lower than the requested rate.

23. A method for selectively modifying a rate of a block transfer connection, comprising the steps of:

receiving a cell from a network, wherein said cell is associated with a block containing a plurality of data cells, wherein said cell has a requested block cell rate encoded therein for requesting additional bandwidth that will be committed for the transfer of entire block;

determining an available rate for the block that can be granted to the request that can be less than the requested block cell rate;

modifying the received cell by writing the available rate into the cell over the requested block cell rate; and transmitting the cell to the network, wherein the block transfer connection utilizes delayed-transmission asynchronous transfer mode block transfer protocols.

24. The method according to claim 23, wherein the protocols include asynchronous transfer mode block transfer with immediate transmission.

* * * * *

UNITED STATES PATENT AND TRADEMARK OFFICE
CERTIFICATE OF CORRECTION

PATENT NO.    : 6,504,821 B2
DATED         : January 7, 2003
INVENTOR(S)   : Arthur W. Berger It is certified that error appears in the above-identified patent and that said Letters Patent is hereby corrected as shown below:

Title page,
Item [60], Related U.S. Application Data, "Provisional application No. 60/109,620" should read -- Provisional application No. 60/019,620 --.

Column 1,
Lines 6-7, "Provisional application No. 60/109,620" should read -- Provisional application No. 60/019,620 --.

Signed and Sealed this

Eighteenth Day of January, 2005

JON W. DUDAS
*Director of the United States Patent and Trademark Office*